May 19, 1970 — T. J. PIACENTINO — 3,512,319
EARTH ANCHOR
Filed June 7, 1968
2 Sheets-Sheet 1
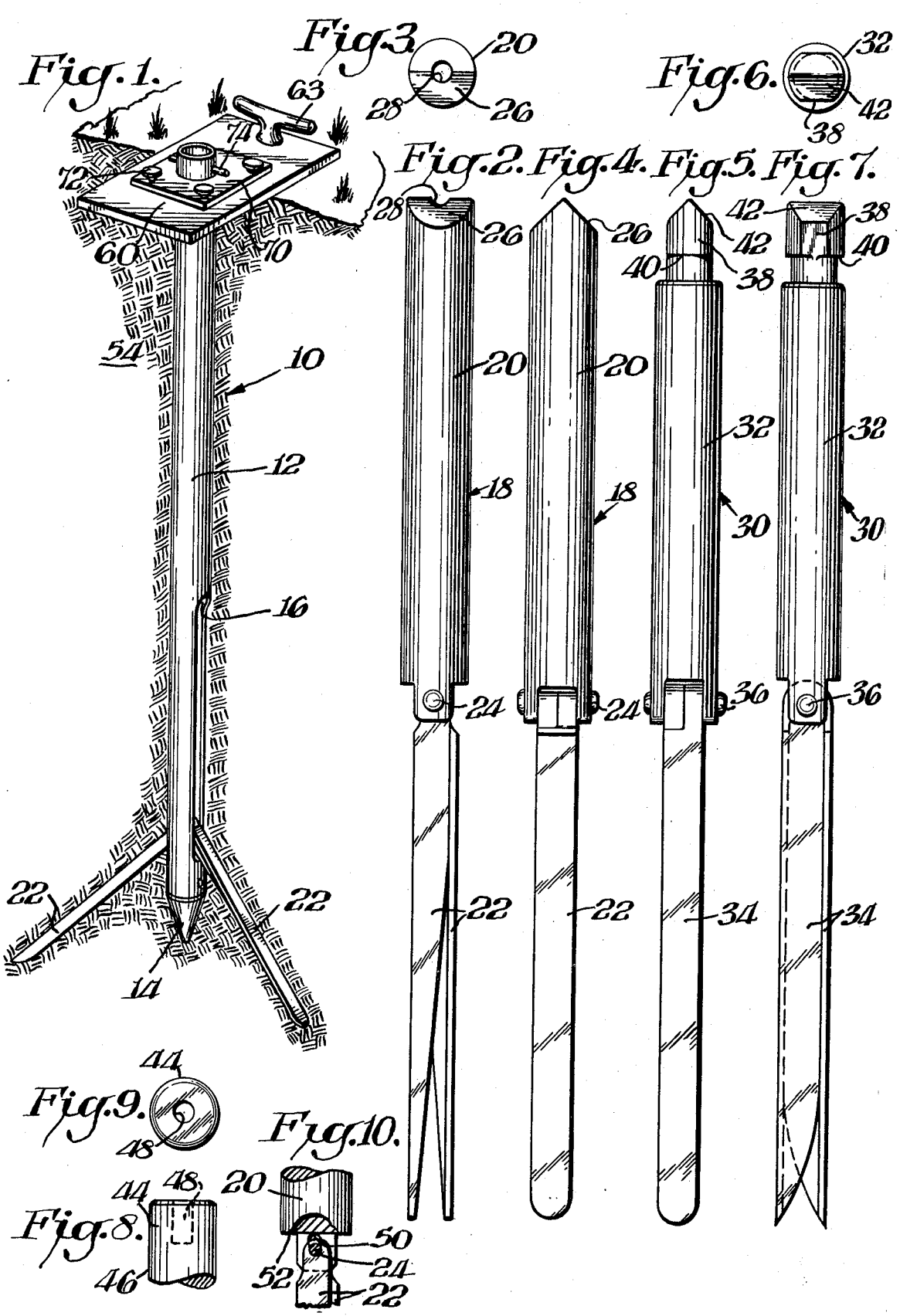

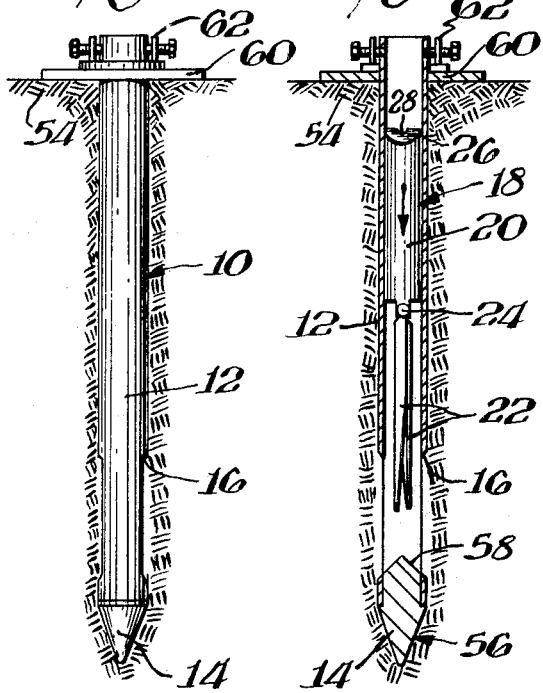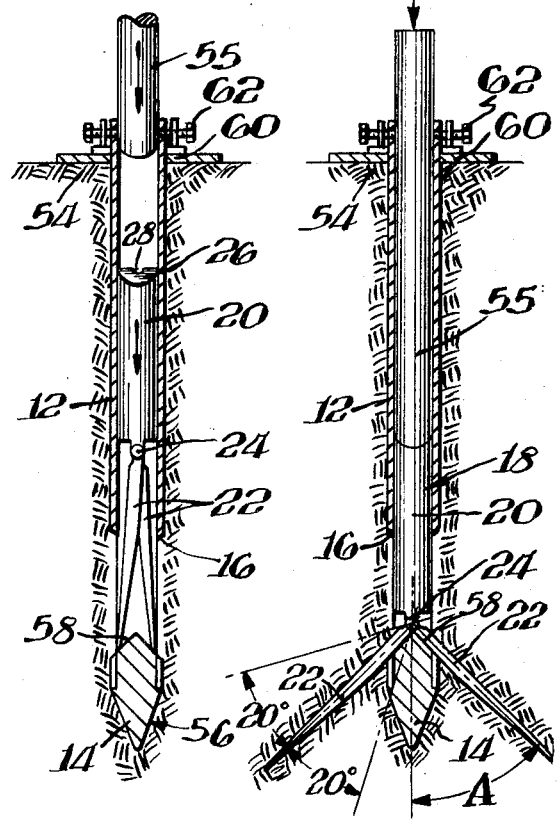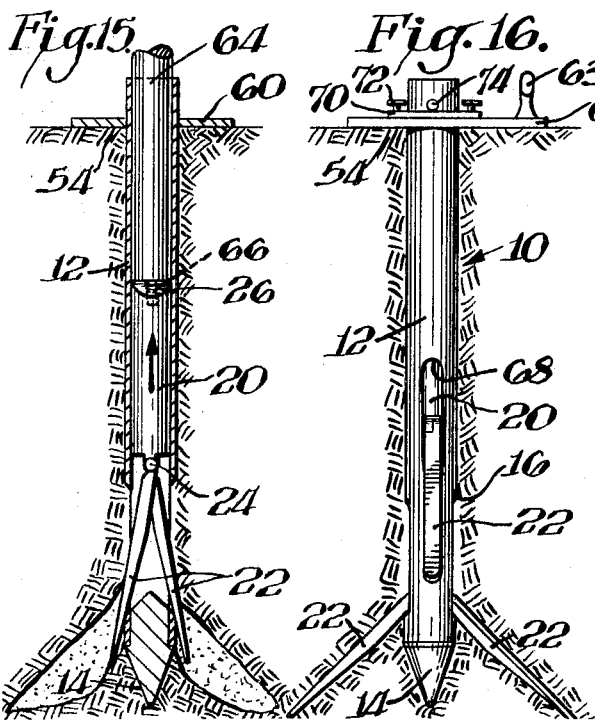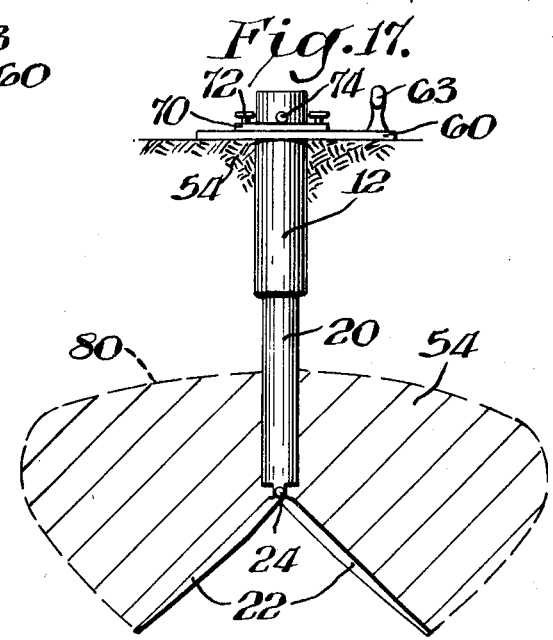

# United States Patent Office 3,512,319
Patented May 19, 1970

3,512,319
EARTH ANCHOR
Thomas J. Piacentino, Kennett Square, Pa., assignor to All American Engineering Company, Wilmington, Del.
Filed June 7, 1968, Ser. No. 735,344
Int. Cl. E02d 5/80
U.S. Cl. 52—160          7 Claims

ABSTRACT OF THE DISCLOSURE

Tines of assembly are pivoted to lower end of carrier bar and driven into earth through slots in sides of previously sunken tube. Tines are diverted outwardly over vertex of wedge-shaped surface in bottom of sunken tube to assume angle substantially above vertical and more than substantial angle below horizontal whereby anchor is firmly secured within earth by free insertion of carrier bar within sunken tube. Carrier bar may be engaged and withdrawn from within tube to release anchor, but engagement of tines within earth prevents upward force upon tube from retracting tines. Even through tines are not fully extended to the horizontal position anchor is firmly secured within earth. In fact, aforementioned angle unexpectedly secures anchor more firmly than full horizontal extension of tines, probably because of greater volume of earth encompassed by inclination of tines. Sunken tube is driven downwardly by impingement on wedge-shaped vertex.

BACKGROUND OF THE INVENTION

A wide variety of pre-existing earth anchors utilize tine assemblies extending through slots in the side of a sunken tube. These anchors, however, positively lock the tine assemblies axially to the sunken tubes in the belief that they would collapse if not so locked. An assembly of such a pre-existing anchor is described in Smith Pat. 2,958,404, granted Nov. 1, 1960.

Accordingly, an object of the present invention is to provide an inexpensive, easy to install and highly satisfactory earth anchor which avoids the disadvantages of the prior art.

SUMMARY OF THE INVENTION

In accordance with the present invention, an earth anchor comprises a hollow tube with a ground piercing point at the bottom of the tube and a pair of slots in opposite sides of the tube adjacent the ground piercing point. A tine assembly is provided for insertion into the hollow tube including a carrier bar for sliding engagement within the tube and a pair of tines for insertion through the slots from within the tube. The upper ends of the tines are pivotally connected to the lower end of the carrier bar. A wedge-shaped surface within the tube adjacent the lower ends of the slots has a substantially axially and upwardly disposed vertex for engaging the tines when they are moved downwardly within and to the bottom of the tube to spread the tines apart. Each tine assumes a substantial angle above the vertical and a substantial angle below the horizontal so that the earth anchor is firmly secured within the earth by the free insertion of the carrier bar within the tube without locking them together.

The pair of slots in the hollow tube may be oriented 180° relative to each other. Moreover, the ground piercing point and the wedge-shaped surface may be formed on opposite sides of a plug secured to the lower end of the hollow tube. Preferably, the tines comprise a pair of mutually nesting fingers.

The earth anchor of the present invention may include a securing collar that surrounds the upper end of the hollow tube. A pin extending through the upper end of the tube restrains upward movement of the collar. A base plate is mounted between the collar and the earth, and adjustable securing structure on the collar maintains the base plate in firm contact with the earth. Structure is also provided for withdrawing the tine assembly from the hollow tube.

A second pair of slots may be provided in the hollow tube above the other slots and oriented 90° relative to them. A wedge-shaped surface at the upper end of the carrier bar has a substantially axially and upwardly disposed vertex for engaging the tines of a second tine assembly when a second assembly is moved downwardly within the hollow tube. The tines of the second assembly are spread apart by the wedge-shaped surface on the carrier bar and enter the earth through the second pair of slots.

The present invention also includes a tine assembly for insertion into a hollow subsurface tube. This assemby includes a carrier bar, a pair of tines, and pivotal structure that connects the upper ends of the tines to the lower end of the carrier bar.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which:

FIG. 1 is a perspective view of an earth anchor according to the present invention;

FIG. 2 is a side elevational view of a tine assembly according to the present invention;

FIG. 3 is a top plan view of the tine assembly illustrated in FIG. 2;

FIG. 4 is a side elevational view of the tine assembly shown in FIG. 2 with the assembly rotated 90°;

FIG. 5 is a side elevational view of a different tine assembly according to the present invention;

FIG. 6 is a top plan view of the tine assembly shown in FIG. 5;

FIG. 7 is a side elevational view of the tine assembly shown in FIG. 5 with the assembly rotated 90°;

FIG. 8 is a fragmental side elevational view of the upper portion of still another tine assembly according to the present invention;

FIG. 9 is a top plan view of the assembly shown in FIG. 8;

FIG. 10 is a fragmental view of a tine assembly illustrating a particular pivotal connection of the tines to the carrier bar of the assembly;

FIG. 11 is an elevational view illustrating a sequence in assembling the earth anchor;

FIG. 12 is a sectional view illustrating another sequence in assembling the earth anchor;

FIG. 13 is a sectional view illustrating another sequence in assembling the earth anchor;

FIG. 14 is a sectional view illustrating still another sequence in assembling the earth anchor;

FIG. 15 is a sectional view illustrating a sequence in disassembling the earth anchor;

FIG. 16 is an elevational view of another earth anchor according to the present invention; and FIG. 17 is a view diagrammatically illustrating the holding power of the earth anchor.

DETAILED DESCRIPTION OF THE INVENTION

In accordance with the present invention, an earth anchor 10 comprises a hollow tube 12 with a ground piercing point 14 at the lower end thereof. The tube has a pair of slotted openings 16 adjacent the ground piercing point. As explained more fully below, the earth anchor 10 includes a tine assembly 18 for insertion into the hollow tube 12 after the tube is driven into the earth. The tine assembly has a carrier bar 20 and a pair of tines 22 pivotally connected at their upper ends to the lower end of the carrier bar by a pivot pin 24. The upper end of the carirer bar 20 has a wedge-shaped surface 26 with a substantially axially and upwardly disposed vertex, for reasons discussed below. Additionally, the upper end of the carrier bar 20 has a longitudinally disposed internally threaded opening 28 to facilitate removal of the tine assembly 18 from the hollow tube 12 when disassembling the earth anchor.

FIGS. 5–7 illustrate a slightly different tine assembly 30 including a carrier bar 32 with a pair of tines 34 pivotally connected to the lower end of the carrier bar by a pivot pin 36. As understood by comparing FIGS. 5 and 7, the upper end portion 38 of the carrier bar has a horizontal offset 40 to facilitate withdrawing the tine assembly 30 from the hollow tube 12 when the earth anchor is disassembled. In this regard, the upper end portion 38 cooperates in bayonet fashion with structure (not shown) for withdrawing the assembly. The withdrawing structure simply fits over the end portion of the tine assembly and is rotated 90° relative to that assembly to form the rereleasable connection. Like the tine assembly 18, tine assembly 30 has a wedge-shaped surface 42 which forms an axially and upwardly disposed vertex, for reasons explained below.

FIGS. 8 and 9 illustrate a configuration for the upper end portion 44 of the carrier bar 46 of a slightly different tine assembly. A longitudinally disposed internally threaded opening 48 is provided for releasably securing mating structure to the carrier bar which structure functions to withdraw the tine assembly during dismantling of the earth anchor in the manner described below.

The pivotal connection between tines such as 22 and carrier bar 20 may be constructed as shown in FIG. 10. In this configuration, the carrier bar has a pair of slotted openings 50 within which the pivot pin 24 may shift in a longitudinal direction. The stress on the pivot pin 24 is eliminated when the tine assembly 18 is driven downwardly into the hollow tube 12. This stress is eliminated by the upper portion of the tines 22 engaging a horizontal surface 52 at the lower end of the carrier bar 20.

The earth anchor is assembled as shown in the sequence of FIGS. 11–15. First, the hollow tube 12 is driven into the earth 54 by a driving tool 55. Preferably, the driving tool comprises a rod somewhat longer than the length of the hollow tube and the rod has an end portion which rests on a plug 56 secured to the lower end of the hollow tube 12. The plug 56 has the ground piercing point 14 at one end thereof and at its opposite inside end the plug has a wedge-shaped surface 58 that defines a substantially axially and upwardly disposed vertex. The driving tool mates with the wedge-shaped surface 58 and when the tool is driven downwardly the hollow tube 12 moves along with it. Thus, the tube is driven into the earth from a point which eliminates the possibility of tube failure as can readily occur when the driving is done on the tube itself at its upper end.

A base plate 60 is mounted at the top of the tube 12 by a collar 62 releasably secured to the tube. The base plate may carry a cleat 63 to facilitate securing whatever desired to the earth anchor 10. With the plate 60 and collar 62 positioned on the tube, the tube is driven into the earth by the driving tool 55 until the plate 60 abuts the surface of the earth.

Once the hollow tube is driven into the earth, a tine assembly, such as 18, is lowered into the tube, as shown in FIG. 12. The tines 22 engage the wedge-shaped surface 58 on the plug 56 and spread apart. This particular position of the tine assembly is shown in FIG. 13. Next, the tine assembly 18 is driven downwardly by using tool 55 so that the tines 22 pass through the slotted openings 16 in the hollow tube 12 and into the earth. Preferably, the angle of inclination of the tines is about 45° with respect to the vertical. This angle is shown as angle A in FIG. 14. A deviation from the optimum angle of 45° in the amount of 20° up or down also provides highly beneficial and sufficient holding power. After the tine assembly is positioned with the tines embedded in the earth the driving tool is removed and the earth anchor is ready for use without any connection of the tine assembly to the hollow tube.

The earth anchor 10 is disassembled by inserting a tine withdrawing tool 64 into the hollow tube 12 until the lower end of the tool engages the upper end of the carrier bar 20. The tool has an externally threaded stud 66 at its lower end which mates with the internally threaded opening 28 in the carrier bar. By turning the withdrawing tool 64 the tool is releasably connected to the tine assembly 18. Finally, when an upward force is exerted on the tool the tines are retracted into the hollow tube through the slotted openings 16 and upwardly out of the tube. In the case of the tine assembly of FIGS. 5–7, a withdrawing tool with an end capable of forming a bayonet connection with the upper end of the carrier bar 32 is utilized. The lower end of the tool is fitted over the upper end 38 of the carrier bar 32 and rotated 90°. Upward movement of the tool removes the tine assembly 30 from the hollow tube.

FIG. 16 illustrates another embodiment of the present invention wherein the earth anchor 10 has a second pair of slotted openings 68 in the hollow tube 12. The openings 68 are spaced above the other openings 16 and are oriented 90° relative to them. The earth anchor is assembled in the same manner as described above and additionally by driving a second tine assembly into the hollow tube after the tines of the first assembly are embedded in the earth. The wedge-shaped surface 26 of the carrier bar first inserted into the hollow tube functions in the same manner as the wedge-shaped surface 58 at the lower end of the hollow tube. In this regard, the tines 22 of the second tine assembly strike the surface 26 and are cammed outwardly through the slots 68 and into the earth. The second tine assembly is then driven downwardly by the driving tool 55 until the tines are extended.

Further, the hollow tube 12 of the earth anchor 10 may include additional slotted openings similar to the openings 16 and 68. Each pair of additional openings may be spaced above the pair directly below them and oriented 90°. As is the case with the anchor illustrated in FIG. 16, the anchor with additional slotted openings is assembled in the same manner, and also by driving a third line assembly into the hollow tube after the tines of the first and second assembly are embedded in the earth. The wedge-shaped surface of the carrier bar second inserted into the hollow tube functions in the same manner as the similarly shaped surface of the carrier bar first inserted into the tube. If a fourth pair of slotted openings is provided the above procedure is repeated with a fourth tine assembly, and so on.

After the tine assembly or assemblies are embedded in the earth the collar 62 is removed, and a collar 70 mounted at the top of the tube 12, as shown in FIG. 16. Collar 70 has adjustable structure 72 for forcing the base plate 60 against the surface of the earth. A pin 74 extending through the hollow tube 12 prevents the collar from moving upwardly, and tightening of the adjustable structure 72 securely anchors the base plate 60 to the earth.

The holding power of the earth anchor 10 is determined by several factors. One of these factors is the weight of soil volume affected by the anchor elements, and another is the shearing forces developed between the surface of this soil volume and the surrounding earth. In most cases the latter factor is predominant. As shown diagrammatically in FIG. 17, the particular inclination of the tines 22 is a key factor. With the tines inclined relative to the horizontal a large volume 80 of earth is influenced which is significantly more than the volume of earth influenced when the tines are horizontal or not significantly inclined with respect to the horizontal. Also, excellent holding power is obtained when the tines engage the soil or hard objects such as rocks, for example, with maximum compression or interference.

What is claimed is:

1. An earth anchor comprising a hollow tube, a ground piercing point at the bottom of said tube, a pair of slots in opposite sides of said tube adjacent said ground piercing point, a tine assembly for insertion into said hollow tube including a carrier bar for sliding engagement within said tube and a pair of tines for insertion into said earth through said slots from within said tube, pivot means rotatably connecting the upper ends of said tines to the lower end of said carrier bar, a wedge-shaped surface within said tube adjacent the lower ends of said slots having a substantially axially and upwardly disposed vertex for engaging and guiding said tines into said earth when they are moved downwardly within and to the bottom of said tube, said carrier bar being substantially as long as said tines and much shorter than said tube whereby it firmly guides said tines through said slots and is disposed in the bottom of said tube a substantial distance below the top of said tube when said tines are inserted through said slots into said earth, recessed means upon the end of said carrier bar remote from said tines providing means for grasping said tine assembly and withdrawing it from said tube, said tines being substantially linear to cause them to be moved outwardly substantially normally against said earth when they are forced apart over said vertex when said tine assembly is forcefully driven down into said tube while said tube is inserted in said earth whereby said earth disposed against said tines is compacted, the adjacent surfaces of the terminal ends of said tines being angularly relieved to provide a fork therebetween for engagement over said vertex to spread said tines apart from each other and extend them through said slots into said earth, the disposition of and reaction between said linear tines and said vertex spreading said tines apart to dispose them in said earth at an angle ranging from at least about 25° below the horizontal to at least about 25° above the vertical with said tine assembly being unsecured within said tube whereby said tube is firmly locked in said soil solely through the action of said tines between said compacted earth and said vertex in conjunction with the reaction of said compacted earth thereagainst.

2. An earth anchor as set forth in claim 1 wherein said pivot means includes elongated slot means whereby the ends of said tines adjacent said carrier bar engage said carrier bar when said carrier bar is driven downwardly into said tube to transmit force therebetween for inserting said tines into said earth and forcing them to move outwardly against it and to minimize said force transmitted through said pivot means.

3. An earth anchor comprising a hollow tube, a ground piercing point at the bottom of said tube, a pair of slots in opposite sides of said tube adjacent said ground piercing point, a tine assembly for insertion into said hollow tube including a carrier bar for sliding engagement within said tube and a pair of tines having substantially straight inner surfaces for insertion through said slots from within said tube, pivot means rotatably connecting the upper ends of said tines to the lower ends of said carrier bar, a wedge-shaped surface within said tube adjacent the lower ends of said slots having a substantially axially and upwardly disposed vertex for engaging and guiding said tines when they are moved downwardly within and to the bottom of said tube, said vertex of said wedge-shaped surface limiting the spread of said tines whereby said tines are spread apart to each assume a substantial angle above the vertical and a substantial angle below the horizontal so that said earth anchor is firmly secured within the earth by the free insertion of the carrier bar within said tube without locking them together, a securing collar surrounding the upper end of said hollow tube, a pin extending through the upper end of said tube for restraining upward movement of said collar, a base plate mounted between said collar and said earth, and adjustable securing means on the collar for maintaining said base plate in firm contact with the earth.

4. An earth anchor as set forth in claim 1 wherein elongated withdrawing bar means is provided, said elongated withdrawing bar means having detachable connecting means on an end constructed and arranged for detachable engagement with said recessed means upon the end of said carrier bar remote from said tines whereby said tine assembly may be withdrawn upwardly from said tube and said earth.

5. An earth anchor as set forth in claim 1 wherein said tines each comprise a linear element of substantially angular cross-section having a pair of linear surfaces disposed at substantially right angles to each other, said linear surfaces of said tines being disposed in radial directions relative to said pivot means whereby the outer pair of said surfaces bear substantially flatly against said earth to compact it when said tines are forced apart and said linear surfaces of said tines are disposed adjacent each other sliding parallel to each other and nesting over each other when said tines are rotated together for insertion into said tube.

6. An earth anchor comprising a hollow tube, a ground piercing point at the bottom of said tube, a pair of slots in opposite sides of said tube adjacent said ground piercing point, a tine assembly for insertion into said hollow tube including a carrier bar for sliding engagement within said tube and a pair of tines for insertion through said slots from within said tube, pivot means rotatably connecting the upper ends of said tines to the lower end of said carrier bar, a wedge-shaped surface within said tube adjacent the lower ends of said slots having a substantially axially and upwardly disposed vertex for engaging said tines when they are moved downwardly within and to the bottom of said tube whereby said tines are spread apart to each assume a substantial angle above the vertical and a substantial angle below the horizontal, a second pair of said slots in said hollow tube above said first-mentioned slots and oriented 90° relative to them, and a wedge-shaped surface at the upper end of said carrier bar having a substantial axially and upwardly disposed vertex oriented 90° relative to the vertex at the bottom of said tube for engaging the tines of a second tine assembly when said second assembly is moved downwardly within said hollow tube whereby said tines of said second assembly are spread apart and enter the earth through said second pair of slots.

7. A tine assembly as set forth in claim 1 wherein said angle is approximately 45°.

References Cited

UNITED STATES PATENTS

| | | | |
|---|---|---|---|
| 389,488 | 9/1888 | Varcher | 285—189 |
| 727,335 | 5/1903 | Fisher | 52—160 |
| 911,504 | 2/1909 | Jay | 52—156 |
| 1,189,787 | 7/1916 | Caddy | 52—160 |
| 1,883,900 | 10/1932 | Harris | 285—189 |
| 1,927,813 | 9/1933 | Abercrombie | 175—79 |
| 1,940,430 | 12/1933 | Morterra | 52—160 |
| 1,982,687 | 12/1934 | O'Brien | 52—160 |
| 2,343,350 | 3/1944 | Warren | 52—156 |
| 3,067,846 | 12/1962 | Laebkeman | 52—157 |

FOREIGN PATENTS 360,484    1931    Great Britain.

HENRY C. SUTHERLAND, Primary Examiner

U.S. Cl. X.R.

52—162